United States Patent
Holopainen et al.

(10) Patent No.: US 9,851,752 B2
(45) Date of Patent: Dec. 26, 2017

(54) MODULAR DIVE COMPUTER

(71) Applicants: Reima K. Holopainen, Zufikon (CH); Stefan E. Wegmann, Zürich (CH); Jari M. A. Tiira, Lenzburg (CH); Bruno Meinrad Erne, Hausen (CH)

(72) Inventors: Reima K. Holopainen, Zufikon (CH); Stefan E. Wegmann, Zürich (CH); Jari M. A. Tiira, Lenzburg (CH); Bruno Meinrad Erne, Hausen (CH)

(73) Assignee: Johnson Outdoors Inc., Racine, WI (US)

( * ) Notice: Subject to any disclaimer, the term of this patent is extended or adjusted under 35 U.S.C. 154(b) by 989 days.

(21) Appl. No.: 14/179,628

(22) Filed: Feb. 13, 2014

(65) Prior Publication Data

US 2014/0226270 A1    Aug. 14, 2014

Related U.S. Application Data

(60) Provisional application No. 61/764,042, filed on Feb. 13, 2013.

(51) Int. Cl.
| | |
|---|---|
| *G01F 23/14* | (2006.01) |
| *G06F 1/16* | (2006.01) |
| *G06F 1/26* | (2006.01) |
| *B63C 11/02* | (2006.01) |

(52) U.S. Cl.
CPC ............ *G06F 1/163* (2013.01); *G06F 1/263* (2013.01); *B63C 2011/021* (2013.01)

(58) Field of Classification Search
CPC ..... G06F 1/163; G06F 1/263; B63C 2011/021
USPC ..... 361/679.03, 679.02, 679.01; 128/205.23; 73/865.1
See application file for complete search history.

(56) References Cited

U.S. PATENT DOCUMENTS

| | | |
|---|---|---|
| 4,586,136 A | 4/1986 | Lewis |
| 4,800,373 A | 1/1989 | Mayz |
| 4,882,678 A | 11/1989 | Hollis et al. |
| 4,949,072 A | 8/1990 | Comerford et al. |
| 5,033,818 A | 7/1991 | Barr |
| 5,097,826 A | 3/1992 | Gray et al. |
| 5,191,317 A | 3/1993 | Toth et al. |
| 5,357,242 A | 10/1994 | Morgano et al. |
| 5,503,145 A | 4/1996 | Clough |

(Continued)

FOREIGN PATENT DOCUMENTS

| | | |
|---|---|---|
| EP | 2 075 189 A1 | 7/2009 |
| WO | WO 85/02255 A1 | 5/1985 |

(Continued)

OTHER PUBLICATIONS

U.S. Appl. No. 14/108,015, filed Dec. 16, 2013, Holopainen et al.

*Primary Examiner* — Anthony Haughton
(74) *Attorney, Agent, or Firm* — Reinhart Boerner Van Deuren P.C.

(57) ABSTRACT

A dive computer system that includes a primary power source and a console, located remotely from the power source. The console includes a display screen configured to be readable underwater. The primary power source is connected to the console via a cable. The console does not include a connection for a gas hose. In certain embodiments the dive computer includes a secondary power source, while in further embodiments the dive computer has a color display.

25 Claims, 4 Drawing Sheets

(56) References Cited

U.S. PATENT DOCUMENTS

| | | |
|---|---|---|
| 5,506,571 A | 4/1996 | Dugan |
| 5,570,688 A | 11/1996 | Cochran et al. |
| 5,899,204 A * | 5/1999 | Cochran ................. A62B 9/006 128/201.27 |
| 6,032,664 A | 3/2000 | Gray et al. |
| 6,054,929 A | 4/2000 | Garofalo et al. |
| 6,201,478 B1 | 3/2001 | Hollis |
| 6,360,182 B1 * | 3/2002 | Hales ..................... A62B 18/08 128/201.27 |
| 6,543,444 B1 | 4/2003 | Lewis |
| 6,791,903 B2 | 9/2004 | Germiquet et al. |
| 6,831,564 B2 | 12/2004 | Bair, III et al. |
| 6,856,578 B2 * | 2/2005 | Magine ................... B63C 11/26 367/134 |
| 6,972,715 B2 | 12/2005 | Hollis et al. |
| 7,089,930 B2 | 8/2006 | Adams et al. |
| 7,190,636 B1 | 3/2007 | Depaola |
| 7,448,378 B2 * | 11/2008 | Hirose .................... B63C 11/02 128/201.27 |
| 7,471,259 B2 | 12/2008 | Wrathall et al. |
| 7,571,726 B2 | 8/2009 | Parker |
| 7,647,927 B2 | 1/2010 | Teetzel et al. |
| 7,686,032 B2 | 3/2010 | Garraffa |
| 7,797,124 B2 | 9/2010 | Hollis et al. |
| 8,033,755 B2 | 10/2011 | Stööd et al. |
| 8,091,422 B2 | 1/2012 | Felske et al. |
| 8,122,763 B2 | 2/2012 | Fundak et al. |
| 2002/0176323 A1 | 11/2002 | Magine et al. |
| 2003/0188744 A1 * | 10/2003 | Deas ........................ A62B 7/02 128/201.27 |
| 2004/0011361 A1 | 1/2004 | Clarke |
| 2007/0205882 A1 | 9/2007 | Ehrlich et al. |
| 2008/0066748 A1 * | 3/2008 | Felske .................... A62B 9/006 128/202.22 |
| 2008/0198026 A1 | 8/2008 | Hatton-Downward |
| 2008/0251074 A1 | 10/2008 | Sand |
| 2009/0135022 A1 | 5/2009 | Hollis et al. |
| 2009/0301739 A1 | 12/2009 | Rother et al. |
| 2010/0081411 A1 | 4/2010 | Montenero |
| 2010/0097232 A1 | 4/2010 | Lee et al. |
| 2010/0193045 A1 | 8/2010 | Xu |
| 2010/0250208 A1 | 9/2010 | Leskeläet al. |
| 2010/0302054 A1 | 12/2010 | Metzler et al. |
| 2011/0055746 A1 | 3/2011 | Mantovani et al. |
| 2011/0140913 A1 | 6/2011 | Montenero |
| 2011/0290247 A1 | 12/2011 | Raisch |

FOREIGN PATENT DOCUMENTS

| | | |
|---|---|---|
| WO | WO 93/00134 A1 | 1/1993 |
| WO | WO 2007/148318 A1 | 12/2007 |

* cited by examiner

MODULAR DIVE COMPUTER

CROSS-REFERENCE TO RELATED PATENT APPLICATIONS

This patent application claims the benefit of U.S. Provisional Patent Application No. 61/764,042, filed Feb. 13, 2013, the entire teachings and disclosure of which are incorporated herein by reference thereto.

FIELD OF THE INVENTION

This invention generally relates to scuba diving equipment, and more particularly to air-integrated dive computers.

BACKGROUND OF THE INVENTION

Scuba diving enthusiasts have realized that there is value in having an air-integrated dive computer with a color display. Such displays may improve underwater readability of the dive computer display, especially at greater depths. However, color displays tend to consume significantly more power than conventionally build LCD displays. For this reason, dive computers with color displays often require high-capacity power sources. Because the weight and volume of a high-capacity power source can make the dive computer cumbersome and the scuba diving experience less enjoyable, it would be desirable to have a dive computer with a color display that is not cumbersome to use.

Embodiments of the invention provide such a dive computer. These and other advantages of the invention, as well as additional inventive features, will be apparent from the description of the invention provided herein.

BRIEF SUMMARY OF THE INVENTION

In one aspect, embodiments of the invention provide a dive computer system that includes a primary power source and a console, located remotely from the power source. The console includes a display screen configured to be readable underwater. The primary power source is connected to the console via a cable. The console does not include a connection for a gas hose. In certain embodiments the dive computer includes a secondary power source, while in further embodiments the dive computer has a color display.

In an embodiment of the invention, the power source is located proximate a pressure sensor on a gas storage tank worn by a diver. Further, pressure data from the pressure sensor and/or nitrox analysis data may be transmitted via the cable to the console for display on the display screen. In particular embodiments, the console is configured to attach to a dedicated holder configured to be worn on a diver's arm.

In certain embodiments, the power source is shared with an underwater camera, and wherein the console is configured to display video and photos stored on the underwater camera. Further, the power source may be shared with an underwater communications device, and the console may be configured to exchange data with the underwater communications device and to display data from the underwater communications device on the display screen. In other embodiments, the power source is shared with an underwater navigation unit, and the console is configured to exchange data with the underwater navigation unit and to display data from the underwater navigation unit on the display screen.

Further, the power source may be shared with a diving lamp, and the console configured to display the remaining burn time of the diving lamp, and further configured to regulate power to the diving lamp to extend the burn time of the diving lamp. Additionally, the power source may be shared with a closed-circuit rebreather, wherein the console is configured to operate a solenoid valve in the closed-circuit rebreather. In at least one embodiment, the power source is shared with a diving propulsion vehicle. The console is configured to display the remaining run time of the diving propulsion vehicle, and further configured to regulate power to the diving propulsion vehicle to extend the run time of the diving propulsion vehicle.

In an alternative embodiment, the primary power source is a removable part of the console, i.e. a removable battery pack. The user may select different capacity power sources depending on the desired length of use. In an arrangement where the only primary power source present is provided as a removable part of the console and a pressure sensor is provided proximate the gas storage tank of the diver, a cable can be provided that connects the pressure sensor to the console. The cable could also be used to supply power from the primary power source connected to the console to the pressure sensor.

In some embodiments, a system may be provided that has two separate primary power sources. One primary power source is located remote from the console and would be connected to the console via a cable and the second primary power source would be able to be attached directly to the console. Preferably, the two primary power sources would connect to the remainder of the console using a same interface and would be used independently and not together. As such, a user would disconnect one of the primary power sources, such as the one that uses the cable and is remote from the console, and then connect the other, second, power source to the same location at which the first power source was connected.

In a particular embodiment, a dive computer system includes a console, a first primary power source and a second primary power source. The console has display screen, preferably color, configured to be readable underwater. The console does not include a connection for a gas hose. The first primary power source is connectable to the console and positionable remote from the console. The first primary power source includes a cable to connect the first primary power source to the console to provide power to the console from the first primary power source. The second primary power source is mountable to the console as a removable part of the console.

In a particular embodiment, the cable for connecting the first primary power source to the console and the secondary second primary power are connectable to the console at a common interface.

In one embodiment, the first primary power source is located proximate a pressure sensor on a gas storage tank worn by a diver.

In one embodiment, data from the pressure sensor is transmitted via the cable to the console for display on the display screen.

In one embodiment, the first and second primary power sources have a same connector for connecting to the console.

In another aspect, embodiments of the invention provide a dive computer system that includes a primary power source, a secondary power source, and a console, located remotely from the primary power source. The console has a display screen configured to be readable underwater. In particular embodiments, the primary power source is connected to the console via a cable, while the secondary power source is in the console, and wherein the console does not include a connection for a gas hose.

In a particular embodiment of the invention, the primary power source is configured to provide power to the console and to at least one other device. The at least one other device may be one of an underwater camera, a diving lamp, a closed circuit rebreather, an underwater communications device, an underwater navigation device, and a diving propulsion vehicle.

In a further embodiment, the primary power source is a disposable battery, and wherein the secondary power source is a rechargeable battery. In certain embodiments, one of the primary and secondary power sources is located proximate a pressure sensor on a gas storage tank worn by a diver. The secondary power source may be located remotely from the console, or in alternate embodiments is located in or adjacent the console. In a particular embodiment, the display screen is a high-definition color display screen.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
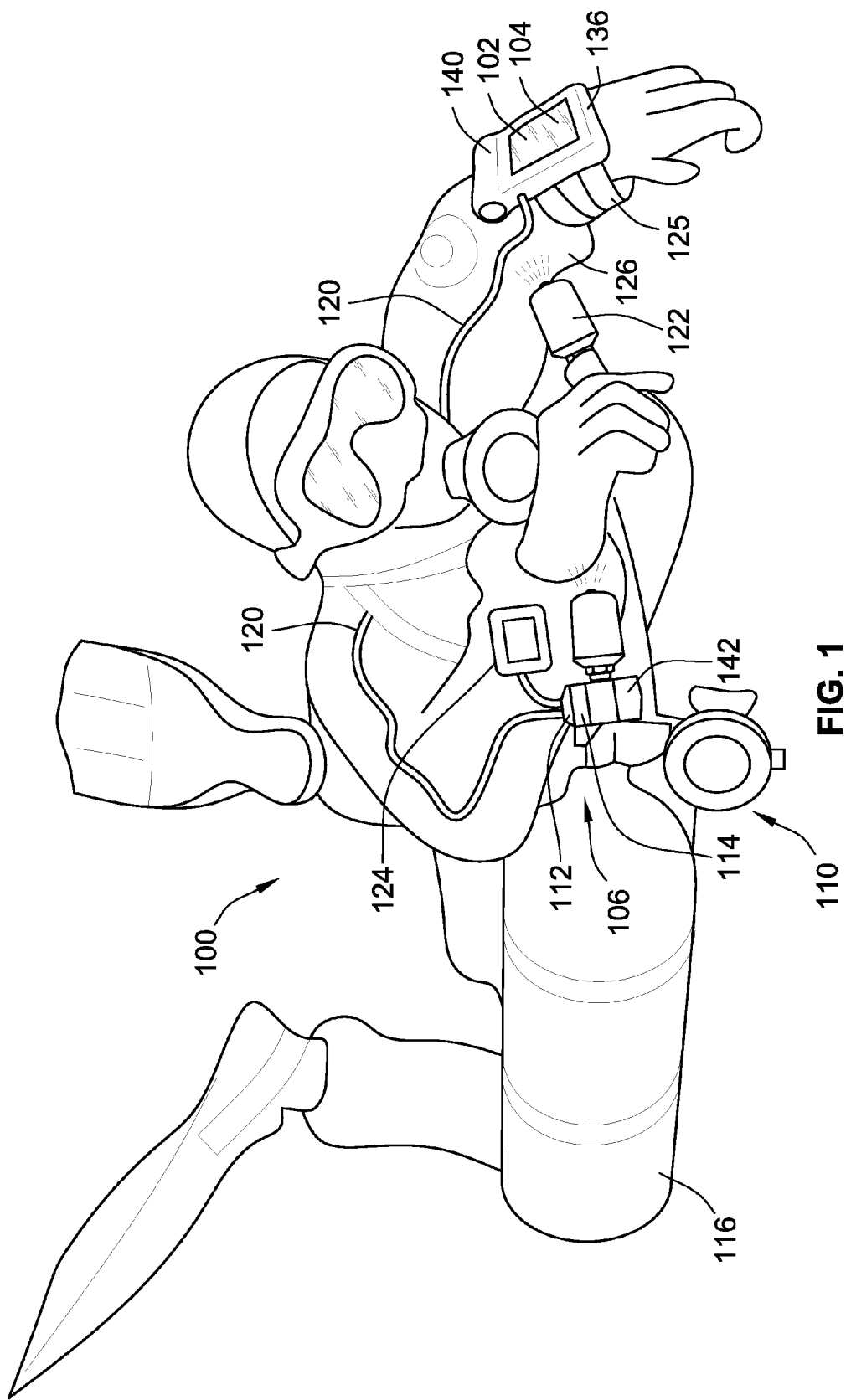
FIG. 1 is a perspective view of an air-integrated dive computer system incorporated into scuba diving equipment, in accordance with an embodiment of the invention.

FIG. 1 shows a perspective view of a dive computer system 100 with a display screen and air integration, according to an embodiment of the invention. In an embodiment of the invention, the dive computer system 100 has a console 102 (also referred to as a dive computer) with a high-definition color display 104, and with air integration 106 has been realized without a high-pressure hose. By eliminating the stiff high-pressure hose typically used in conventional dive computers, the dive computer console 102 is easier to handle. In FIG. 1, the console 102 is shown attached to a diver's wrist. However, due to the flexibility of the system it can be easily stored and carried in other locations. It can be stowed for example in the pocket of a buoyancy control device (BCD) or divesuit. Also, the dive computer console 102 can be used easily in the vertical or horizontal position.

Such a configuration results in increased safety. Without the high-pressure hose, the high pressure is isolated to the first stage of the regulator 110 and high-pressure hose leaks are eliminated. Additionally, as illustrated in FIG. 1, the power source 112, typically a battery, can be located, for example, proximate the pressure sensor (transducer) on the gas storage tank 116 at the first stage regulator 110. Power can be fed via an information wire/battery cable 120 to the console 102. This reduces the size and weight of the console 102. The volume and weight of the battery 112 is added to diver's back, where it is more easily carried, along with the large gas storage or scuba tank 116.

In the embodiment of FIG. 1, the console 102 is connected to the power source 112 (such as a dive computer battery) and pressure sensor 114 (also referred to as a pressure transducer) via the information wire/battery cable 120, also referred to herein as simply "the cable 120". It should be noted that, in this embodiment, there is no high-pressure hose connecting the console 102 to the regulator 110 or the pressure sensor 114. The cabled connection described above allows for the secure transmission of pressure data to the console 102, thus eliminating wireless link losses seen in diving gear with wireless data transmission systems. Further, the console 102 can be attached to the diver's arm, whereas units with an integrated high-pressure hose must hang from the first stage of the regulator 110 due to the resistance provided by the high-pressure hose in prior devices.

The cable 120 may also provide for the transfer of other types of data at the same time pressure data is being relayed to the console 102. For example, enriched air, or nitrox, analysis may be performed automatically at the gas storage tank 116, and the information transmitted, via the cable 120, to the console 102 for display to the diver.

By separating the console 102 from the power source 112 for the console 102, this allows the user to select from among different power sources without affecting the computer or features thereof. For example, the power source 112 may be a small battery pack for used by beginners, travelers and normal recreational divers. Larger multi-battery packs can be selected by heavy users like scuba instructors or technical divers who want longer operational time. Divers may also choose between rechargeable and disposable batteries depending on the cost and environmental factors to be considered or in the event that batteries are needed and time for a charge is not permissible or a charging source is not available.

The cable 120 between the console 102 and particularly the dive computer thereof and other units can be connected to a digital bus. The bus-organized network allows multiple devices to be connected to, and controlled from, the bus without increasing the number of wires. Reducing the number of wires needed reduces the thickness and weight of the cable. Also, with one cable 120, the number of watertight feedthroughs are decreased. As an example, in a closed circuit rebreather (CCR) unit, two different high-pressure sensors can be connected to the same cable (one for oxygen first stage and the other for diluent first stage). Further, additional types of diving equipment, such as additional high-pressure sensors, diving lamps, underwater cameras, etc., can be connected to the bus or even act as a display for displaying the pressure information other than console 102.

Additionally, the power source 112 for the dive computer 102 can be integrated with other underwater equipment where it may be convenient to share power, sensor information or other data with the other device. For example, the dive computer 102 may share a power source with an underwater camera. The dive computer 102 may also be configured to display on its high-definition display 104 video or photos taken and stored on the underwater camera.

Similarly, the dive computer 102 may share a power source with a diving lamp 122. The dive computer 102 may be configured to show the remaining burning time for the diving lamp 122 based on the battery charge. In a further embodiment, the dive computer 102 is configured to regulate power to the diving lamp 122 to extend the burning time of the diving lamp 122.

In a particular embodiment, the dive computer 102 shares power with the closed circuit rebreather (CCR) unit. Additionally, the dive computer 102 may be configured to display data, such as partial pressure oxygen data, gleaned from the CCR unit. In more particular embodiments, the dive computer is configured to control the CCR solenoid valve.

In an embodiment of the invention, the dive computer 102 is configured to share power with an underwater navigation unit and/or underwater communication unit (illustrated schematically at reference character 124 in FIG. 1). Data to and from the underwater navigation unit and/or underwater communication unit 124 can be exchanged with the console 102. In at least one embodiment, the dive computer 102 is configured to share power with a Diver Propulsion Vehicle (DPV) (not shown). The dive computer 102 may also be configured to show the remaining drive time of the DPV due to the charge remaining on the battery.

As stated above, the console 102 can be attached to the diver's arm as illustrated in FIG. 1. Specifically, the cabled console 102 can be directly attached to dedicated holders 125 on the arm of the dive suit 126. This has advantage over the arm straps, usually elastic, used with many conventional wireless dive computers. For example, it may be difficult to attach the console 102 to the arm strap with one hand. There may be safety concerns with using an arm strap, depending on the strength of the strap material or of the buckle mechanism, if present. Further, with conventional arm straps, there is the possibility of the wireless dive computer falling off of the diver's arm and being lost in the water.

A neoprene diving suit or air inflated dry suit compresses at depth. Conventional arm straps must compensate for this dimensional loss by being pulled tight relying on the material elasticity to hold the dive computer in place. As the diver surfaces, the diving suit expands making the arm strap uncomfortable, and potentially affecting blood circulation and even contributing to skin decompression sickness.

Figure 2:
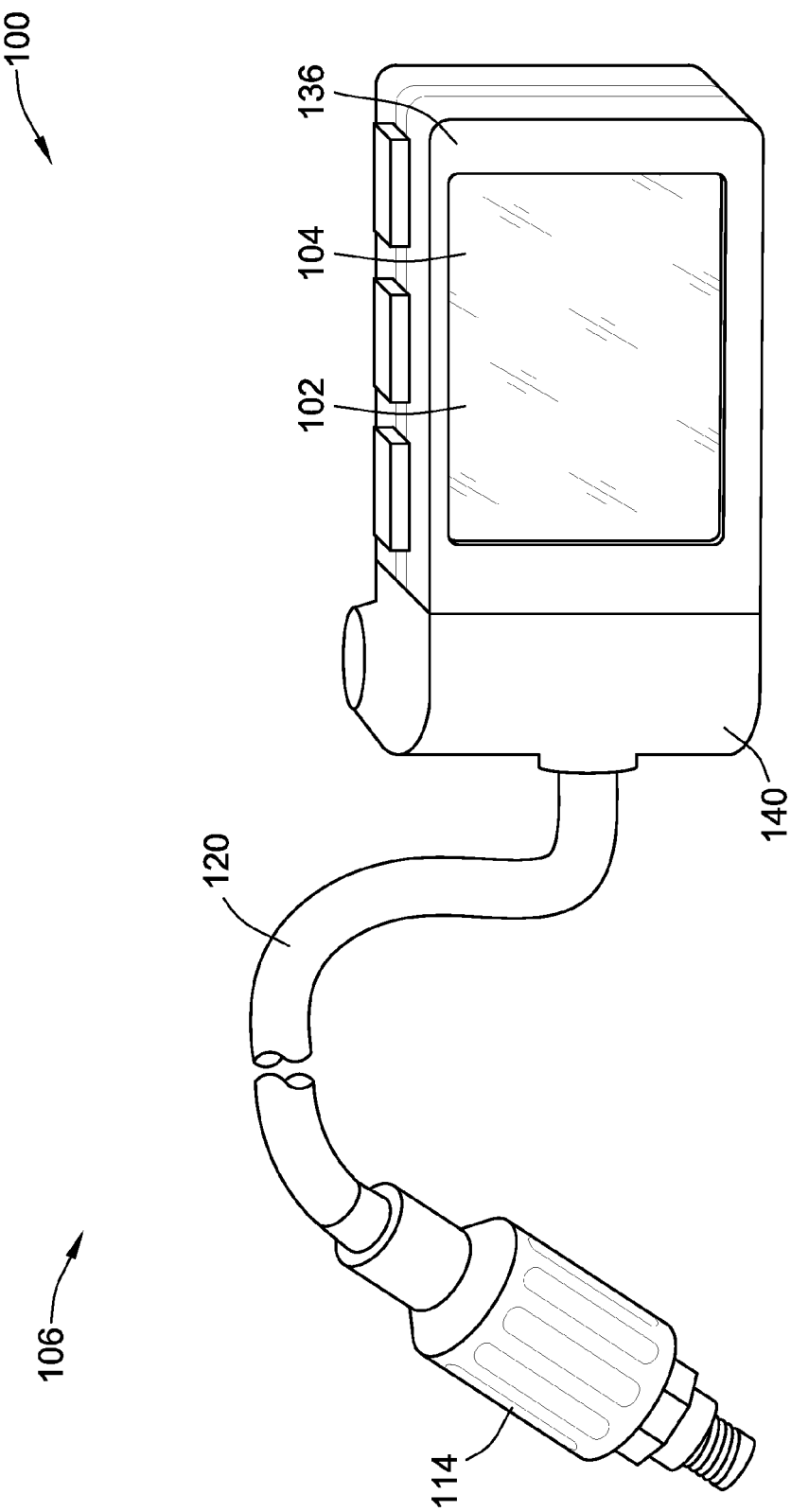
FIG. 2 is a perspective view of the air-integrated dive computer system of FIG. 1.
Figure 3:
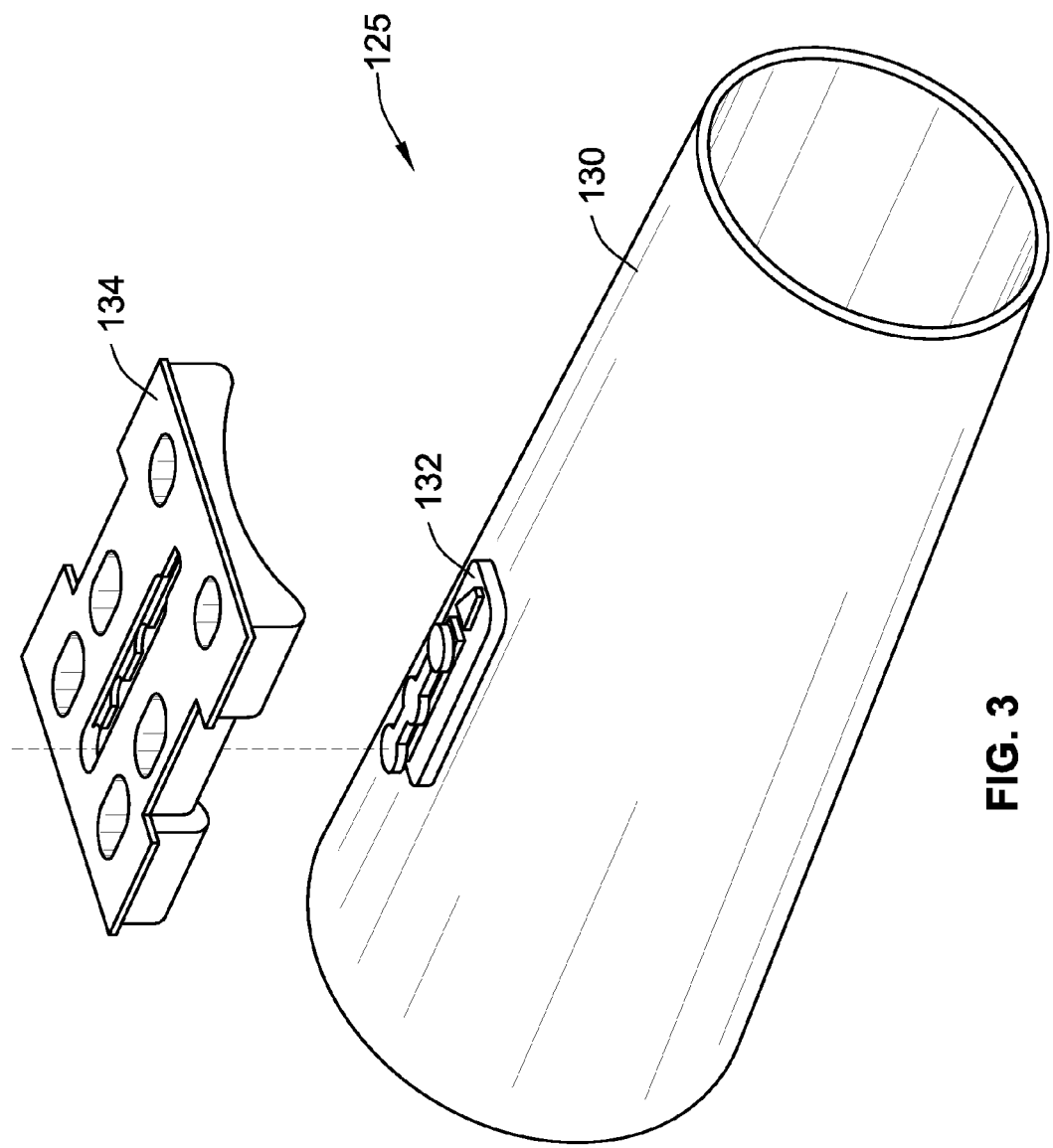
FIG. 3 is a perspective view of an arm-mounted holding device, according to an embodiment of the invention.

Use of the console 102 with the dedicated arm mounted holding device 125 allows the diver to quickly and easily don and remove the buoyancy control device. With such a holding device 125, the dive computer 102 can be a part of the suit 126, such that the diver can take the suit 126 off without the dive computer 102 falling to the ground and getting lost. FIG. 3 is a perspective view of an arm-mounted holding device 125, constructed in accordance with an embodiment of the invention. In the embodiment of FIG. 3, a tubular member 130 is designed to fit over the divers arm. The tubular member 130 may be made of neoprene or some other similarly suitable material. The tubular 130 member has a latching mechanism 132. A holding mechanism 134 attaches to the latching mechanism 132. The housing 136 (see FIGS. 1 and 2) for the dive computer 102 may be configured to snap onto, press fit into or otherwise secured to the holding mechanism 134. In an alternative embodiment, the tubular member 130 may be part of the diver's wetsuit such as a sleeve and the latching mechanism 132 is part of the diver's dive suit.

In the illustrated embodiment of the invention, the dive computer 102 includes a dual power source including one or more backup batteries. The second power source may be a backup battery attached to the console 102 such as backup battery 140 or carried proximate the storage tank such as backup battery 142. Having a backup battery 140, 142 allows for the main power source or primary battery 112 to be exhausted. With respect to the primary battery 112, reserves are not needed for ending the dive safely. The secondary battery 140, 142 allows for more efficient use of disposable standard batteries. Further, the battery runtime estimation algorithm becomes much easier or may not be needed at all because once the primary battery 112 becomes spent, the diver could be signaled to begin ascent to the surface.

Also, a dual power source allows for use of multi-chemistry standard cells in the battery compartment, such as rechargeable 1.2V nickel-cadmium-metal hydride batteries, 1.5V alcalium/lithium-iron, 3V lithium manganese or 3.6V lithium inorganic batteries. Further, this configuration supports the use of an external power source. This configuration also allows all of the stored information to remain at the console 102 even when the main power source 112 is removed or hot swapped. This dual power source configuration, particularly with the backup battery 140 which is carried by console 102, also avoids latch-up with external devices because the console 102 is powered continuously.

Figure 4:
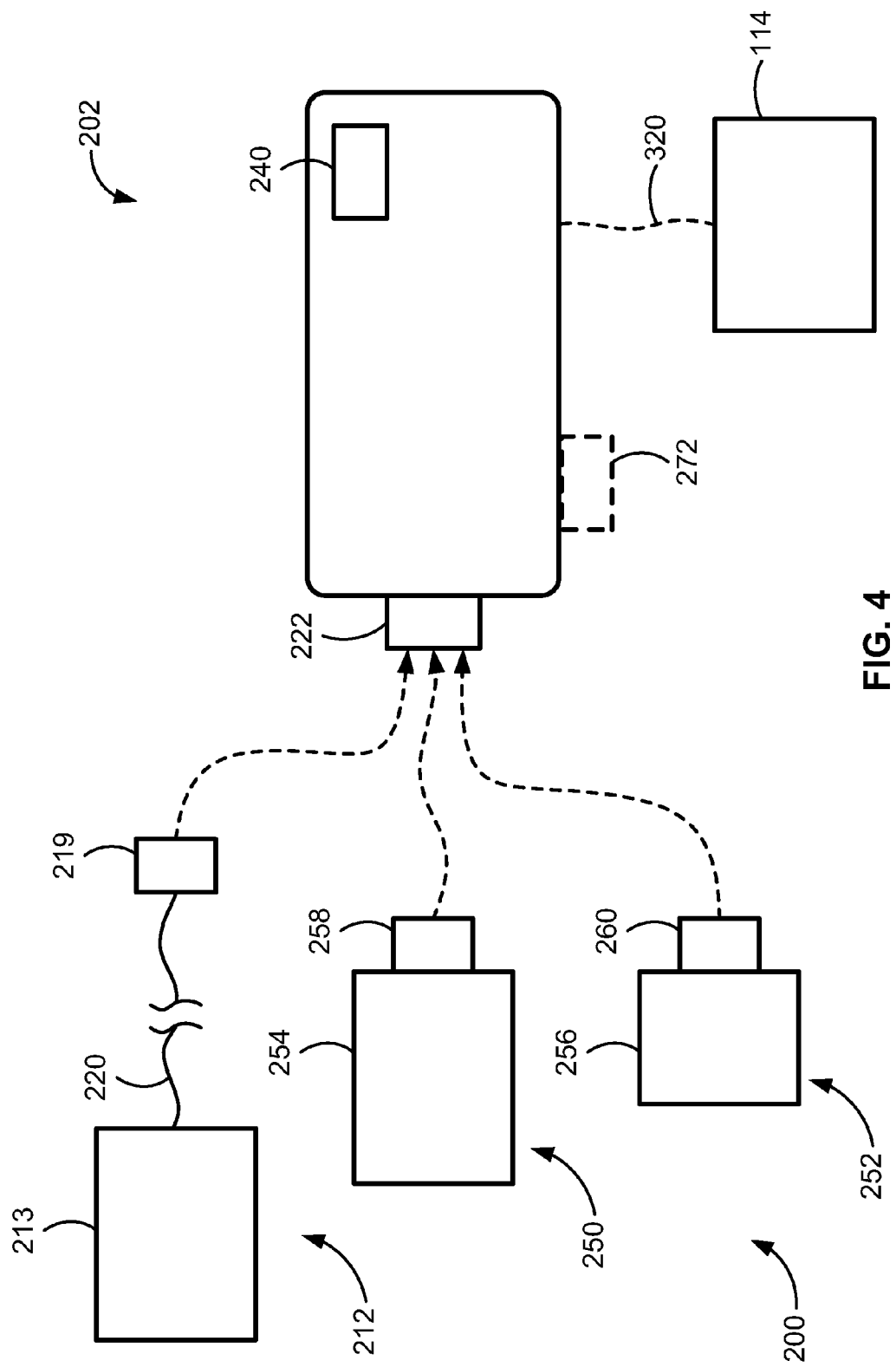
FIG. 4 is a schematic illustration of a further system that utilizes multiple primary power sources.

Additional power source options are provided. FIG. 4 illustrates a further dive computer system 200 embodiment where the primary power source is removable from the console 202. In the illustrate embodiment three separate primary power sources are provided. First, remote power source 212 which includes a battery 213 that may be located remote from the console 202, such as at the storage tank as discussed above, and is operably connected to the console 202 by connector 219 and information wire/battery cable 220. Connector 219 would be connectable to connector 222, which is part of console 202.

The second and third primary power sources 250, 252 are removable parts of the console 202. Both the second and third primary power sources 250, 252 are similar to one another but provide different capacity for varied run time. Each primary power source 250, 252 includes a battery 254, 256 that is operably connectable to the connector 222 of console 202 via connectors 258, 260. As such, a user could disconnect one of the primary power sources 212, 250, 252, such as primary power source 212 that is remote from the console 202 and connected by information wire/battery cable 220 and then connect the one of the other power sources 250, 252 using the same connector 222.

By allowing for the power source to be removable, the user may select different capacity power sources depending on the desired length of use or as well as the amount of additional weight they are willing to carry while diving. Preferably, the primary power sources 212, 250, 252 connect to the console 202 using the same interface or connector 222, as mentioned. However, it is possible that the primary power sources could connect at separate interfaces and/or using separate connectors, as discussed in an embodiment below.

If the only power source is one that forms a part of the console, i.e. no remote power source 212 is present where the battery pack 213 is carried proximate the first stage regulator, an information wire/battery cable 320 can be used to supply power to the pressure sensor 114 as well as transmit pressure data from the pressure sensor 114 to the console 202. However, it could be possibly to wirelessly transmit information between the pressure sensor, or other sensors, and the console 202 when a power source is used that forms a removable part of the console 202.

Further yet, in some embodiments, a system may be provided that has two separate primary power sources. One primary power source may be located remote from the console while the other primary power source is a removable part of the console. For instance, with further reference to the system 200 in FIG. 4, the console 202 could include an auxiliary connector 272 (shown in dashed lines) so as to connect remote power source 212 to the console using information wire/battery cable 220 while one of the second or third power sources 250, 252 could be connected directly to the console 202 at connector 222.

While system 200 illustrates the use of power sources 212, 250, 252 that can be disconnected from console 202, the console may also include a secondary power source 240 that will power the console 202 for a short period of time. This could be used in instances where a diver is switching between different primary power sources or where the primary power source dies and the user is given a limited amount of time to surface or to maintain the information stored within the console 202.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A dive computer system comprising:
   a power source; and
   a console, located remotely from the power source, the console having a color display screen configured to be readable underwater;
   wherein the power source is connected to the console via a cable to provide power to the console, and wherein the console does not include a connection for a gas hose.

2. The dive computer system of claim 1, wherein the power source is located proximate a pressure sensor on a gas storage tank worn by a diver.

3. The dive computer system of claim 2, wherein pressure data from the pressure sensor is transmitted via the cable to the console for display on the display screen.

4. The dive computer system of claim 2, wherein nitrox analysis data is transmitted via the cable to the console for display on the display screen.

5. The dive computer system of claim 1, wherein the console is configured to attach to a dedicated holder configured to be worn on a diver's arm.

6. The dive computer system of claim 5, wherein the dedicated holder comprises a tubular member configured to fit on the diver's arm, the tubular member having a latching mechanism configured to removably attach to a holding mechanism for the dive computer.

7. The dive computer system of claim 1, further comprising a secondary power source connected to the console via the cable.

8. A dive computer system comprising:
   a power source; and
   a console, located remotely from the power source, the console having a color display screen configured to be readable underwater;
   wherein the power source is connected to the console via a cable to provide power to the console, and wherein the console does not include a connection for a gas hose; and
   wherein the power source is shared with an underwater camera, and wherein the console is configured to display video and photos stored on the underwater camera.

9. A dive computer system comprising:
   a power source; and
   a console, located remotely from the power source, the console having a color display screen configured to be readable underwater;
   wherein the power source is connected to the console via a cable to provide power to the console, and wherein the console does not include a connection for a gas hose; and
   wherein the power source is shared with an underwater communications device, and wherein the console is configured to exchange data with the underwater communications device and to display data from the underwater communications device on the display screen.

10. A dive computer system comprising:
    a power source; and
    a console, located remotely from the power source, the console having a color display screen configured to be readable underwater;
    wherein the power source is connected to the console via a cable to provide power to the console, and wherein the console does not include a connection for a gas hose; and
    wherein the power source is shared with an underwater navigation unit, and wherein the console is configured to exchange data with the underwater navigation unit and to display data from the underwater navigation unit on the display screen.

11. A dive computer system comprising:
a power source; and
a console, located remotely from the power source, the console having a color display screen configured to be readable underwater;
wherein the power source is connected to the console via a cable to provide power to the console, and wherein the console does not include a connection for a gas hose; and
wherein the power source is shared with a diving lamp, and wherein the console is configured to display the remaining burn time of the diving lamp, and further configured to regulate power to the diving lamp to extend the burn time of the diving lamp.

12. A dive computer system comprising:
a power source; and
a console, located remotely from the power source, the console having a color display screen configured to be readable underwater;
wherein the power source is connected to the console via a cable to provide power to the console, and wherein the console does not include a connection for a gas hose; and
wherein the power source is shared with a closed-circuit rebreather, and wherein the console is configured to operate a solenoid valve in the closed-circuit rebreather.

13. A dive computer system comprising:
a power source; and
a console, located remotely from the power source, the console having a color display screen configured to be readable underwater;
wherein the power source is connected to the console via a cable to provide power to the console, and wherein the console does not include a connection for a gas hose; and
wherein the power source is shared with a diving propulsion vehicle, and wherein the console is configured to display the remaining run time of the diving propulsion vehicle, and further configured to regulate power to the diving lamp to extend the run time of the diving propulsion vehicle.

14. A dive computer system comprising:
a primary power source;
a secondary power source; and
a console, located remotely from the primary power source, the console having a display screen configured to be readable underwater;
wherein the primary power source is connected to the console via a cable, and wherein the console does not include a connection for a gas hose.

15. The dive computer system of claim 14, wherein the secondary power source is configured to provide power to the console when the primary power source is depleted or disconnected.

16. The dive computer system of claim 14, wherein the primary power source is a disposable battery, and wherein the secondary power source is a rechargeable battery.

17. The dive computer system of claim 14, wherein the console is configured to attach to a dedicated holder configured to be worn on a diver's arm.

18. The dive computer system of claim 16, wherein the dedicated holder comprises a tubular member configured to fit on the diver's arm, the tubular member having a latching mechanism configured to removably attach to a holding mechanism for the dive computer.

19. The dive computer system of claim 14, wherein one of the primary and secondary power sources is located proximate a pressure sensor on a gas storage tank worn by a diver.

20. The dive computer system of claim 14, wherein the secondary power source is located remotely from the console.

21. The dive computer system of claim 14, wherein the secondary power source is located in or adjacent the console.

22. The dive computer system of claim 14, wherein the display screen is a high-definition color display screen.

23. A dive computer system comprising:
a primary power source;
a secondary power source; and
a console, located remotely from the primary power source, the console having a display screen configured to be readable underwater;
wherein the primary power source is connected to the console via a cable, and wherein the console does not include a connection for a gas hose; and
wherein the primary power source is configured to provide power to the console and to at least one other device.

24. The dive computer system of claim 23, wherein the at least one other device is one of an underwater camera, a diving lamp, and a closed circuit rebreather.

25. The dive computer system of claim 23, wherein the at least one other device is one of an underwater communications device, an underwater navigation device, and a diving propulsion vehicle.

* * * * *